(12) United States Patent
Choi (10) Patent No.: US 7,113,807 B2
(45) Date of Patent: Sep. 26, 2006

(54) BASE STATION AND METHOD FOR RECEIVING AND PROCESSING SIGNAL IN THE BASE STATION

(75) Inventor: Wan Choi, Seoul (KR)

(73) Assignee: KT-Freetel Co., Ltd., Seoul (KR)

( * ) Notice: Subject to any disclaimer, the term of this patent is extended or adjusted under 35 U.S.C. 154(b) by 0 days.

(21) Appl. No.: 10/512,043

(22) PCT Filed: Aug. 28, 2002

(86) PCT No.: PCT/KR02/01620

§ 371 (c)(1),
(2), (4) Date: Jul. 21, 2005

(87) PCT Pub. No.: WO03/090381

PCT Pub. Date: Oct. 30, 2003

(65) Prior Publication Data

US 2006/0035673 A1    Feb. 16, 2006

(30) Foreign Application Priority Data

Apr. 22, 2002 (KR) ............................... 2002/21979

(51) Int. Cl.
*H04M 1/00* (2006.01)
(52) U.S. Cl. .................. 455/562.1; 455/561; 455/63.4; 455/67.16; 375/347; 343/757
(58) Field of Classification Search ..... 455/561–562.1, 455/101, 127.01, 121, 334, 25, 63.4, 67.17; 375/347, 267; 343/757, 777, 842, 907, 893
See application file for complete search history.

(56) References Cited

U.S. PATENT DOCUMENTS

| | | | |
|---|---|---|---|
| 2002/0034968 A1* | 3/2002 | Fischer et al. | 455/562.1 |
| 2002/0054580 A1* | 5/2002 | Strich et al. | 370/334 |
| 2002/0085643 A1* | 7/2002 | Kitchener et al. | 375/267 |
| 2003/0027596 A1* | 2/2003 | Okubo et al. | 455/560 |
| 2003/0054828 A1* | 3/2003 | Dent | 455/450 |
| 2003/0144032 A1* | 7/2003 | Brunner et al. | 455/562.1 |
| 2003/0171139 A1* | 9/2003 | Sarresh et al. | 455/562.1 |
| 2004/0038713 A1* | 2/2004 | Okawa et al. | 455/561 |
| 2004/0063467 A1* | 4/2004 | Shapira et al. | 455/561 |
| 2005/0136875 A1* | 6/2005 | Skarby et al. | 455/306 |
| 2006/0068848 A1* | 3/2006 | Shapira et al. | 455/562.1 |

(Continued)

FOREIGN PATENT DOCUMENTS

| | | |
|---|---|---|
| KR | 2000-45985 | 7/2000 |
| WO | WO 1999-63677 | 12/1999 |

* cited by examiner

*Primary Examiner*—Joseph Feild
*Assistant Examiner*—Kamaran Afshar
(74) *Attorney, Agent, or Firm*—Pearl Cohen Zedek Latzer, LLP; Mark Cohen (57) ABSTRACT

Disclosed is a method for simplifying a signal processing process of a base station that receives signals through four branches using two two-branch polarized antennas for each sector. The base station receives signals through first and second branches of the first polarized antenna and third and fourth branches of the second polarized antenna, time-delays the signals received at the second and fourth branches so as to distinguish an offset thereof from an offset of the signals received at the first and third branches, adds the signal received at the first branch and the signal received at the second branch and time-delayed, and adds the signal received at the third branch and the signal received at the fourth branch and time delayed. A modem processor separates an offset distinguishable signal from the added signals.

9 Claims, 6 Drawing Sheets

BASE STATION AND METHOD FOR RECEIVING AND PROCESSING SIGNAL IN THE BASE STATION

BACKGROUND OF THE INVENTION (a) Field of the Invention

The present invention relates to a method for receiving signals in a mobile communication network, and a base station thereof. More specifically, the present invention relates to a method for reducing complexity of a base station when the base station uses two two-branch polarization antennas to receive signals through four branches.

(b) Description of the Related Art

In general, signals transmitted from a mobile station antenna are reflected or refracted depending on environmental factors such as the ground or buildings, and they are received to a base station antenna through multiple paths. As described, when various signals are received through different paths, the signals undergo different amplitude attenuations and phase changes. When the signals are combined, signal intensities change according to time variation differing from the signal intensities of transmission signals, which is referred to as fading. To solve the problem of fading, diversity methods for receiving various independently-faded signals and appropriately combining them have been proposed.

The diversity methods include a space diversity method which is a method of transmission by the simultaneous use of two or more physically separated vertical antennas, and a polarization diversity method for separately receiving vertical polarization and horizontal polarization signals. The polarization diversity method uses a polarized antenna to detect polarized signal components and uses them as branches of diversity.

Figure 5:
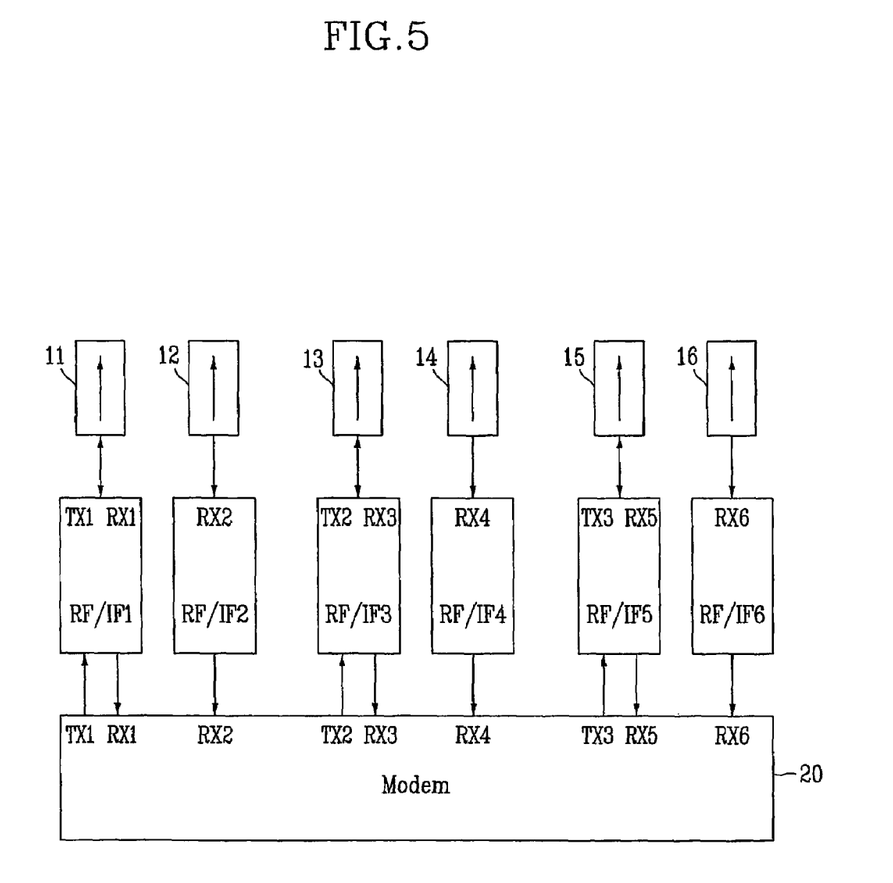
FIG. 5 shows a conventional configuration of a base station.

Base stations based on the mobile communication systems such as IS-95, CDMA2000, and WCDMA generally use the space diversity method by using two vertical antennas spatially separated for each sector to receive signals. In this instance, the reason for using less than three antennas is that less merits are achieved compared to an increase of complexity. The above-noted mobile communication systems usually adopt the three-sector method of using three sectors α, β, and γ. Referring to FIG. 5, a conventional configuration of a base station and a method for receiving signals at the base station will be described.

FIG. 5 shows a conventional base station.

As shown, the conventional base station (e.g., a base station using the three-sector method) includes RF/IF (radio frequency/intermediate frequency) processors RF/IF1 through RF/IF6 for each antenna path. The signals received through the six vertical antennas are passed through the RF/IF processors to be converted into baseband signals, and are input to a modem processor 20.

The modem processor 20 searches multipath signals for the six antenna reception paths to allocate a valid multipath signal component to a finger, and detects a phase of the corresponding multipath signal component to execute MRC (maximal ratio combining) on the signal components allocated to the finger.

In detail, the two antennas in each sector are spatially separated to receive signals with independent fading and phase, but they are not so far from each other that spreading sequence offsets of the signals received at the two antennas differ. Therefore, the signals that have the same spreading sequence offset and different phase and fading are received through the two antennas, and the modem processor 20 performs phase detection and phase correction on these signals, and executes MRC to obtain a diversity effect. So as to achieve the diversity effect, it is required for the respective antenna components to maintain independent signal paths without being added until MRC is executed on them after the phase detection and phase correction.

Recently, a method using two sets of two branch X-pole antennas for enabling usage of both space diversity and polarization diversity has been proposed. That is, when two sets of X-pole polarized antennas are provided for each sector, the polarization diversity characteristics can be obtained through the X-pole antennas, and since the two sets of X-pole antennas are spatially separated, space diversity characteristics can be obtained.

Figure 6:
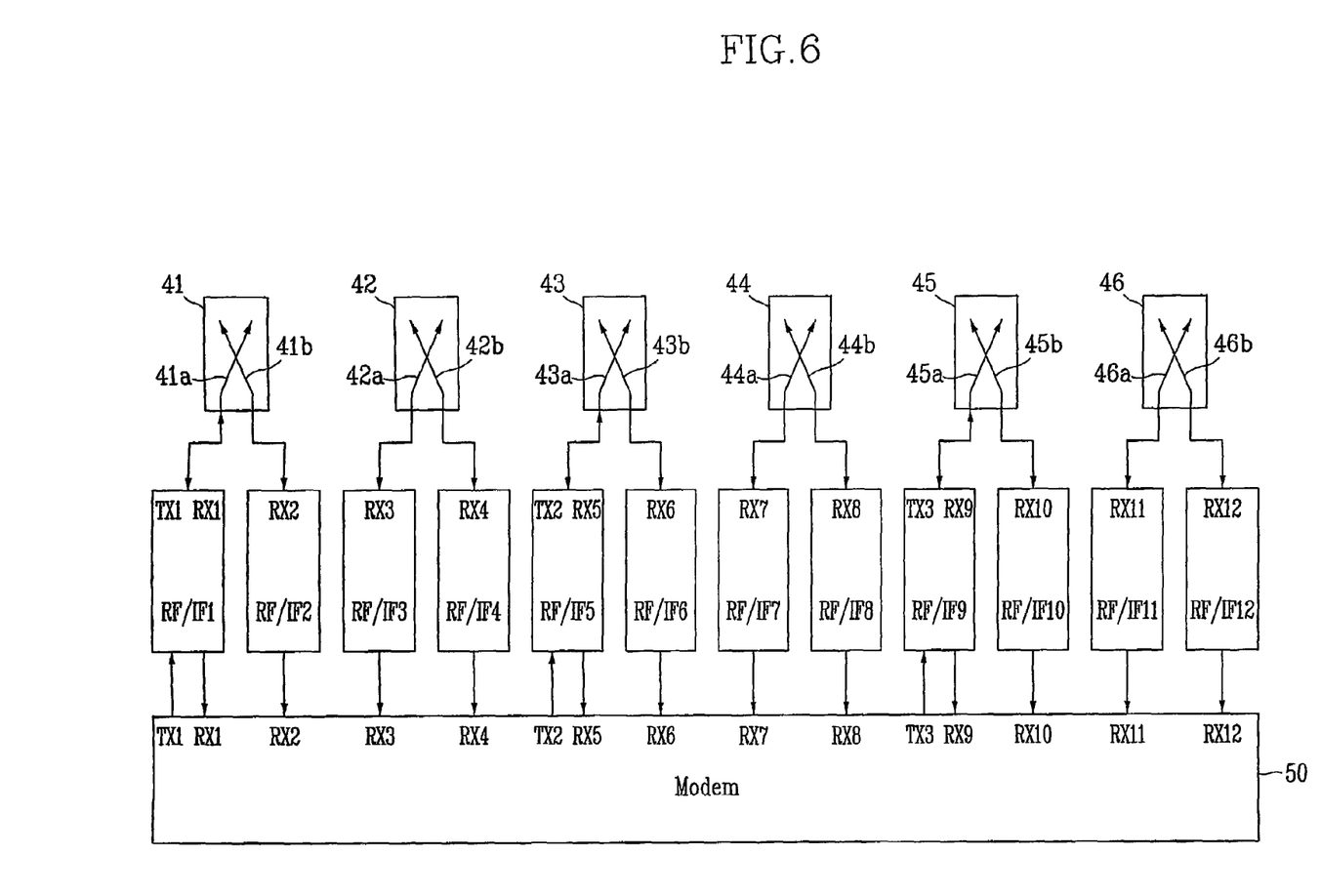
FIG. 6 shows a conventional configuration of a base station using an X-pole polarization antenna.

As shown in FIG. 6, in the two sets of two-branch X-pole antennas 41 and 42, 43 and 44, and 45 and 46, each sector has four branches 41a, 41b, 42a, and 42b; 43a, 43b, 44a, and 44b; and 45a, 45b, 46a, and 46b. Accordingly, twelve RF/IF processors RF/IF1 through RF/IF12 coupled to each branch are to be formed in the base station (e.g., a three-sector base station), and a modem processor 50 having twelve receivers for receiving signals from the twelve RF/IF processors is to be used.

Hence, the number of the RF/IF processors and signal paths increase to increase hardware complexity, and the conventional modem processor is to be modified.

SUMMARY OF THE INVENTION

It is an advantage of the present invention to provide a base station for using two sets of X-pole polarized antennas without modifying a modem processor.

In one aspect of the present invention, a base station in a mobile communication network comprises: first and second polarized antennas respectively having two branches and being formed in a same sector; a first delay element for time-delaying a signal received at the second branch from among signals received at the first and second branches of the first polarized antenna so as to distinguish an offset of the signal from an offset of a signal received at the first branch; a second delay element for time-delaying a signal received at the fourth branch from among signals received at the third and fourth branches of the second polarized antenna so as to distinguish an offset of the signal from an offset of a signal received at the third branch; a first adder for adding the signal received at the first branch of the first polarized antenna and a signal time-delayed by the first delay element; a second adder for adding the signal received at the third branch of the second polarized antenna and a signal time-delayed by the second delay element; and a modem processor for receiving the signals added by the first and second adders and separating an offset distinguishable signal from the respective signals.

In this instance, it is preferable to locate RF and IF processors between the first and second adder and the modem processor. The RF and IF processors may be located between the first and second antennas and the first and second adders. The RF processor may be located between the first and second antennas and the first and second adders, and the IF processor may be located between the first and second adders and the modem processor.

In another aspect of the present invention, a method for receiving and processing signals at a base station in a mobile communication network comprises: receiving signals through first and second polarized antennas respective having first and second branches and third and fourth branches formed in the same sector; time-delaying the signals received at the second branch of the first polarized antenna and the fourth branch of the second polarized antenna so as to distinguish offsets of the signals from offsets of signals received at the first and third branches; adding the signal received at the first branch and the signal received at the second branch and time-delayed into a first add signal, and adding the signal received at the third branch and the signal received at the fourth branch and time-delayed into a second add signal; and separating an offset distinguishable signal from the first and second add signals.

In still another aspect of the present invention, a base station in a mobile communication network comprises: a polarized antenna having first and second branches; a delay element for time-delaying a signal received at the second branch of the polarized antenna so as to distinguish an offset of the signal from an offset of a signal received at the first branch; an adder for adding the signal received at the first branch and the signal received at the second branch and time-delayed by the delay element; and a modem processor for considering an offset distinguishable signal from the added signals as a different multipath signal, and separating the same.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
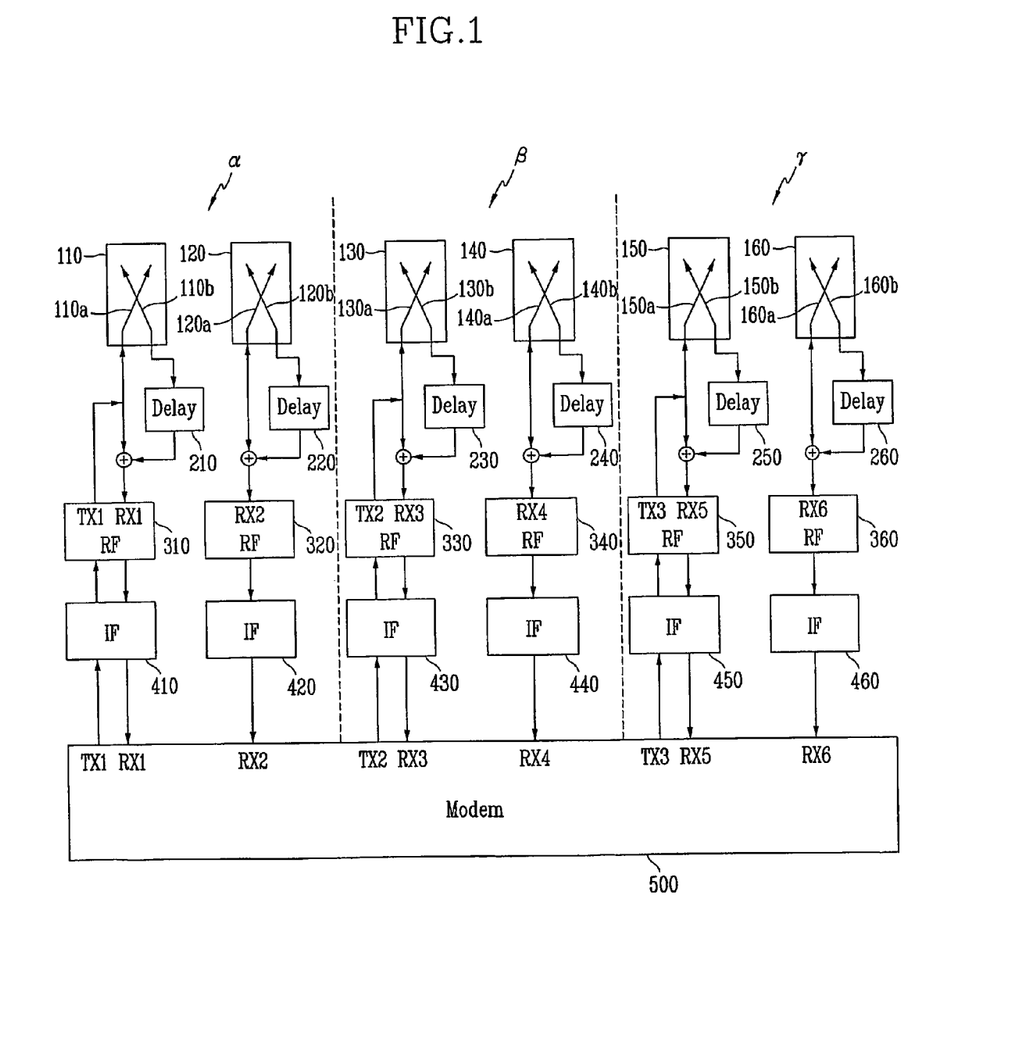
FIG. 1 shows a configuration of a base station according to a first preferred embodiment of the present invention.

Referring to FIG. 1, a base station according to a first preferred embodiment of the present invention will be described.

Figure 2:
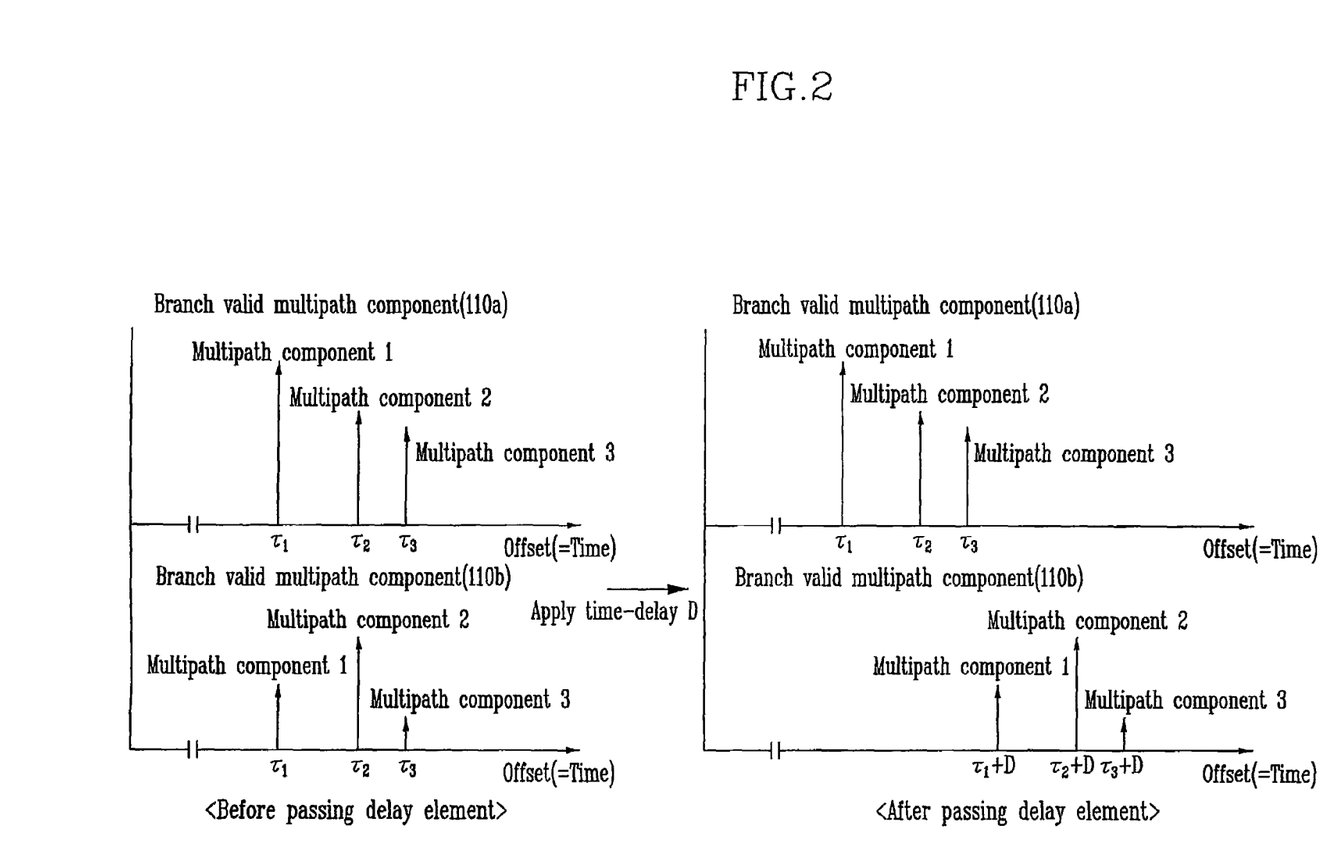
FIG. 2 shows a difference of spreading sequence offsets caused by time delay according to a first preferred embodiment of the present invention.

FIG. 1 shows a configuration of a base station according to the first preferred embodiment of the present invention, and FIG. 2 shows a difference of spreading sequence offsets caused by time delay according to the first preferred embodiment of the present invention.

A base station in the mobile communication system adopting the three-sector method will be exemplified below.

As shown in FIG. 1, the base station includes three sectors α, β, and γ each of which has two X-pole polarized antennas 110, 120, 130, 140, 150, and 160, each of which has two branches (the two branches are respectively denoted as 'a' and 'b', and the reference numerals 'a' and 'b' in the drawings represent the branches of each antenna). The antennas 110, 120, 130, 140, 150, and 160 includes RF processors 310, 320, 330, 340, 350, and 360, and IF processors 410, 420, 430, 440, 450, and 460 connected to a modem processor 500. In this instance, a single RF processor 310, 330, and 350 and a single IF processor 410, 430, and 450 for each sector perform a transmission function.

The X-pole polarized antenna is an antenna for realizing two-branch polarization diversity, and two sets of X-pole antennas are provided for each sector in the first preferred embodiment. The two X-pole antennas in each set are spatially separated to obtain the space diversity effect, and two sets of the spatially separated two-branch polarization diversities can realize four branches.

Signals received at the four branches have independent phases and undergo independent fading, but the spreading sequence offsets of the signals received through the branches at the same time frame are identical. When the signals having the same spreading sequence offset received at the branches are added before execution of phase correction, signal distortion occurs, and it becomes difficult for the modem processor to demodulate the signals.

In the first preferred embodiment, therefore, delay elements 210, 220, 230, 240, 250, and 260 for delaying the signals received at one 110b, 120b, 130b, 140b, 150b, and 160b of the two branches of the polarized antenna are additionally formed between the branch 110b, 120b, 130b, 140b, 150b, and 160b and the RF processor 310, 320, 330, 340, 350, and 360. For example, as shown in FIG. 2, an additional spreading sequence offset is provided to the signal delayed by the delay element 210 from among the signals received at the two branches 110a and 110b of the antenna 110, and accordingly, the signals received through different branches at one polarized antenna have different spreading sequence offsets.

In this instance, a time delay D assigned by the base station is to be determined such that the spreading sequence offsets of the multipath components of branches without time delay are not superimposed on the spreading sequence offsets of the multipath components of branches with time delay, and a time delay value is established according to a multipath delay profile. For example, since valid multipath components are received by the time delay of up to 25 µs in the worst case under a wireless urban environment with heavy multipath delays, it is needed to assign the time delay D of about 25 µs to one of the two branches.

That is, when the time delay D of 30.72 chips (=25 µs×1.2288 MHz) is provided in the case of using the spreading sequences of 1.2288 MHz, no spreading sequence offsets of valid multipath components received through branches without time delay are superimposed on the spreading sequence offsets of valid multipath components received through branches with time delay.

The signals received at the branches 110a, 120a, 130a, 140a, 150a, and 160a without time delay and the signals received at the branches 110b, 120b, 130b, 140b, 150b, and 160b with time delay are added by an adder, and added signals are provided to the RF processors 310, 320, 330, 340, 350, and 360. The RF processors 310, 320, 330, 340, 350, and 360 convert the signals into IF signals and provide the IF signals to the IF processors 410, 420, 430, 440, 450, and 460. The IF processors 410, 420, 430, 440, 450, and 460 convert the IF signals into baseband signals, and provide the baseband signals to the modem processor 500.

Since the signals input to the modem processor 500 are signals added with distinguished spreading sequence offsets, these signals are processed in the same manner of signals input to the modem processor 500 through different antennas and the RF/IF processing path. In detail, since the signals input to respective reception ends of the modem processor 500 are signals generated by adding the signals without time delay and the signals with time delay and distinguishing the spreading sequence offsets, a searcher of the modem processor 500 considers the signals as various multipath components of the same antenna and divides the signals. The modem processor 500 allocates valid multipath signal components to fingers, detects phases of the corresponding multipath signal components to correct the same, and executes MRC on the signal components allocated to the fingers. Other signals with different phases are corrected to have the identical phase, and the MRC is performed on the corrected signals, thereby obtaining the diversity effect.

In the first embodiment, two sets of X-pole polarized antennas spatially separated for each sector are used, and since the X-pole polarized antennas have two branches, signals can be received with four branches per sector. In this instance, since one of the signals received at the two branches of each antenna is assigned a time delay, the signal and the time delay are added, and the added result is transmitted to the modem processor, the modem processor needs to have two reception (Rx) ends for each sector. That is, since the modem processor used by the conventional base station, which has two vertical antennas for each sector and each antenna has a branch, has two reception (Rx) ends for each sector, the conventional modem processor can be applied to the present invention.

As described, since two RF processors and two IF processors are used per sector in the first preferred embodiment, hardwired complexity does not increase, and since two sets of X-pole polarized antennas are used to increase the number of the diversity branches to four, the performance-improved base station can be realized by the diversity. But if the signals are delayed and added before they are input to the modem processor in the same manner of the first embodiment, performance may be somewhat degraded because of signal superimposition between parts of weak components (i.e., the multipath components that are more time-delayed than the artificially given time delay, and are received) from among multipath components received through an antenna to which no artificial time delay is given according to characteristics of multipath delay, and important components from among artificially time delayed multipath components, but this kind of performance degradation relatively ignored compared to the diversity effect obtainable by using two sets of the X-pole polarized antennas for each sector.

In order to avoid even the partial performance degradation, it is desirable to process the modem processor through a separate path, which disadvantageously increases hardwired complexity caused by an increase of the RF processors or the IF processors. Therefore, a base station that does not greatly increase its complexity and uses two sets of X-pole polarized antennas thereby obtaining the diversity effect can be realized according to the first embodiment.

Other preferred embodiments of the present invention will be described referring to FIGS. 3 and 4.

Figure 3:
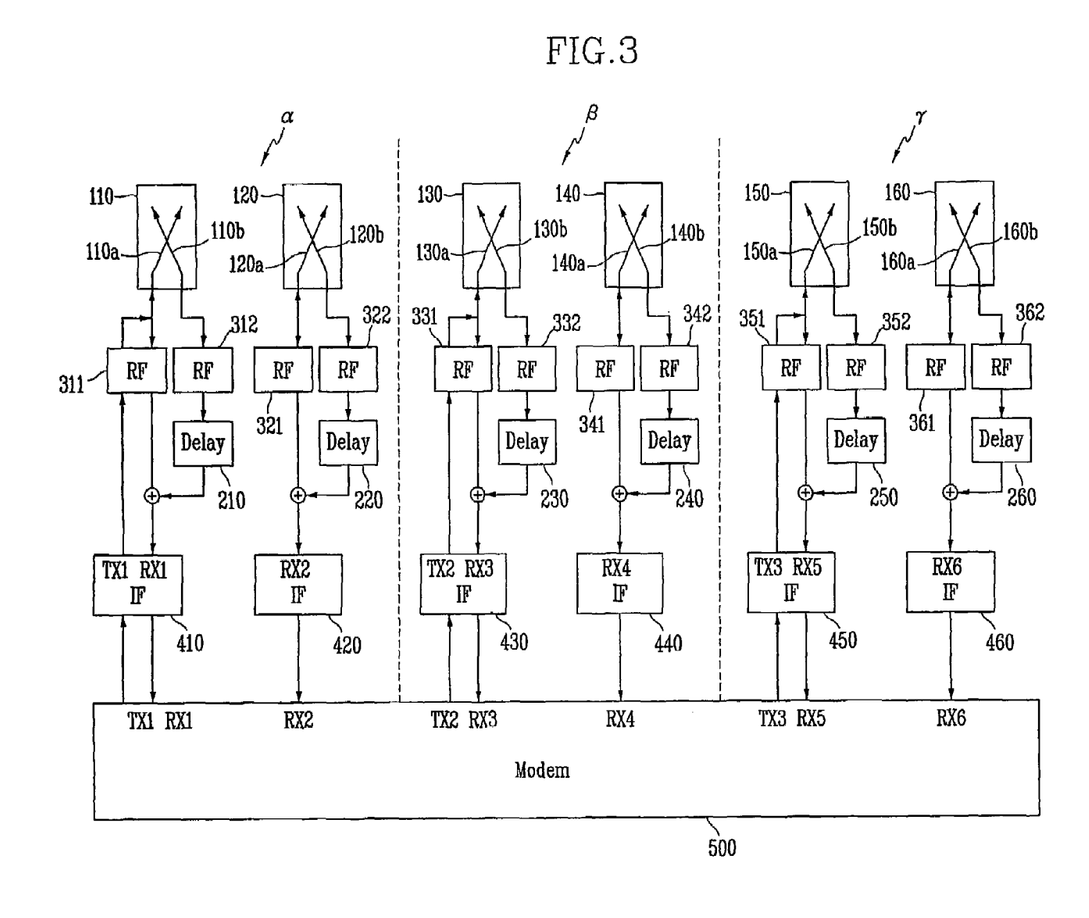
FIGS. 3 and 4 show configurations of a base station according to second and third preferred embodiments of the present invention.
Figure 4:
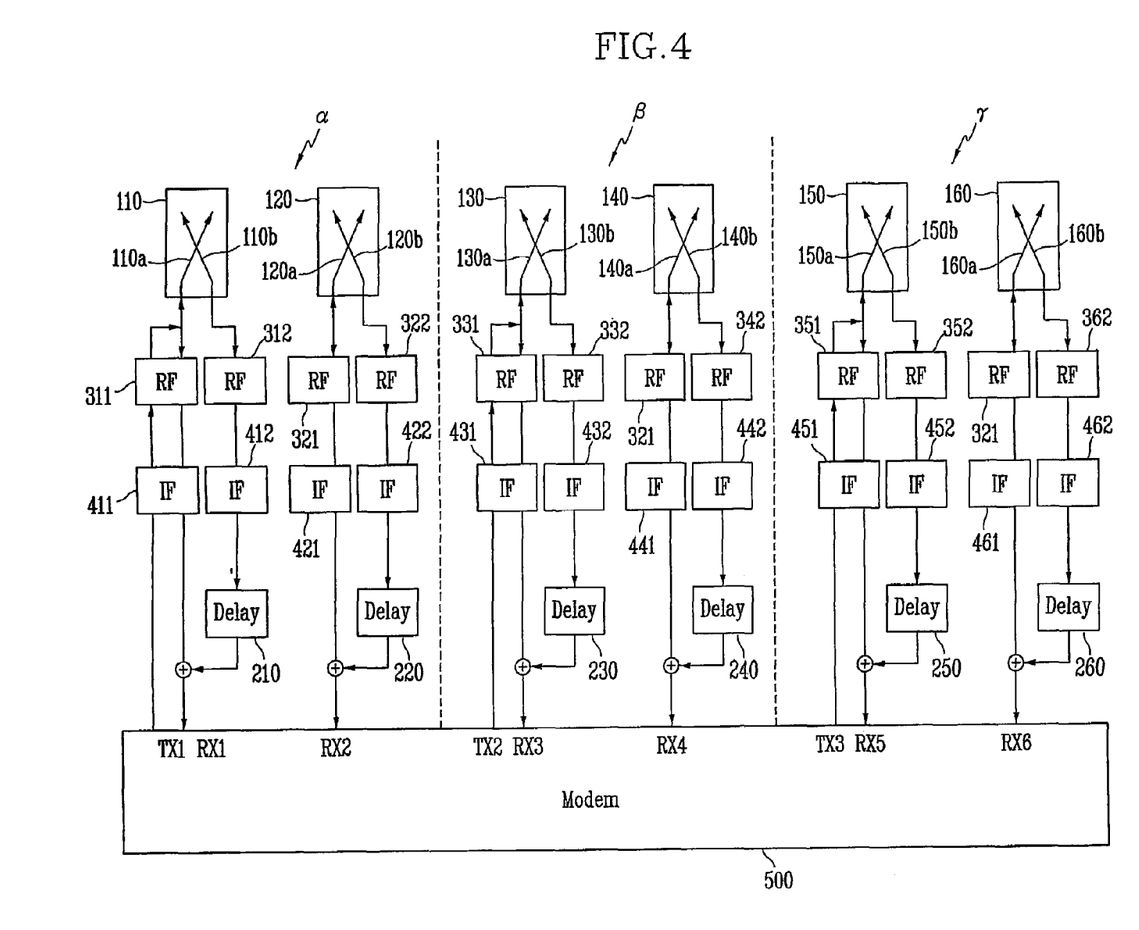

FIGS. 3 and 4 show configurations of a base station according to second and third preferred embodiments of the present invention.

As shown in FIG. 3, the base station according to the second preferred embodiment is matched with the first preferred embodiment except that the number of RF processors is different and the delay elements are located between the RF processors and the IF processors.

In detail, the signals received at the branches 110a, 110b, 120a, 120b, . . . , 160a, 160b of the respective antennas 110 through 160 are respectively transmitted to the RF processors 311, 312, 321, 322, . . . , 361, 362 and converted into IF signals. The signals passed through the RF processors 312, 322, . . . , 362 are delayed by delay elements 210, 220, . . . , 260, and added, by an adder, with the signals passed through the RF processors 311, 321, . . . , 361. The added signals are converted into baseband signals by the IF processors 410 through 460, and the baseband signals are transmitted to the modem processor 500.

According to the second preferred embodiment, the number of RF processors problematically becomes twice compared to the first embodiment since the signals are added after passing through the RF processor.

A third embodiment for adding the signals passed through the RF processor will now be described referring to FIG. 4.

As shown in FIG. 4, the base station according to the third preferred embodiment is matched with the first preferred embodiment except that the number of RF processors and IF processors is different and the delay elements are located between the IF processors and the modem processor.

In detail, the signals received at the branches 110a, 110b, 120a, 120b, 160a, 160b of the respective antennas 110 through 160 are respectively transmitted to the RF processors 311, 312, 321, 322, . . . , 361, 362 and the IF processors 411, 412, 421, 422, . . . , 461, 462 and converted into baseband signals. The signals passed through the IF processors 412, 422, . . . , 462 are delayed by delay elements 210, 220, . . . , 260, and added, by an adder, with the signals passed through the RF processors 411, 421, . . . , 461, and transmitted to the modem processor 500.

According to the third preferred embodiment, the number of RF processors and IF processors problematically becomes twice compared to the first embodiment since the signals are added after passing through the RF processor.

In the first to third preferred embodiments, the delay elements are respectively provided between the antenna and the RF processor, between the RF processor and the IF processor, and between the IF processor and the modem processor to delay the signals and add delayed signals. However, without being restricted to this, the present invention includes a method for time-delaying the signals received through a single branch of an antenna having two branches, adding the same with other signals without time delay received through another branch, and transmitting the added signals to the modem processors.

According to the present invention, since time-delayed signals for distinguishing offsets and time-undelayed signals are added, and the added signals are divided by the modem processor, the diversity base station using two sets of X-pole polarized antennas that require four branch processing for each sector without modifying the modem processor of the base station can be realized. That is, the hardwired modification of the base station is minimized, thereby providing simple hardware.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A base station in a mobile communication network, comprising:

first and second polarized antennas respectively having two branches and being formed in a same sector;

a first delay element for time-delaying a signal received at the second branch from among signals received at the first and second branches of the first polarized antenna so as to distinguish an offset of the signal from an offset of a signal received at the first branch;

a second delay element for time-delaying a signal received at the fourth branch from among signals received at the third and fourth branches of the second polarized antenna so as to distinguish an offset of the signal from an offset of a signal received at the third branch;

a first adder for adding the signal received at the first branch of the first polarized antenna and a signal time-delayed by the first delay element;

a second adder for adding the signal received at the third branch of the second polarized antenna and a signal time-delayed by the second delay element; and a modem processor for receiving the signals added by the first and second adders and separating an offset distinguishable signal from the respective signals.

2. The base station of claim 1, further comprising:

first and second RF (radio frequency) processors respectively connected to the first and second adders, for converting the respective signals from the first and second adders into IF (intermediate frequency) signals; and first and second IF processors respectively connected between the first and second RF processors and the modem processor, for converting the respective signals from the first and second RF processors into baseband signals, and transmitting the baseband signals to the modem processor.

3. The base station of claim 1, further comprising:

first through fourth RF processors respectively connected to the first through fourth branches, for converting the respective signals from the first through fourth branches into IF signals, and respectively transmitting the IF signals to the first adder, the first delay element, the second adder, and the second delay element; and first and second IF processors connected between the first and second adders and the modem processor, for converting the signals from the first and second adders into baseband signals, and transmitting the baseband signals to the modem processor.

4. The base station of claim 1, further comprising:

first through fourth RF processors respectively connected to the first through fourth branches, for converting the respective signals from the first through fourth branches into IF signals; and first through fourth IF processors respectively connected between the first through fourth RF processors, the first adder, the first delay element, the second adder, and the second delay element, for converting the signals from the first through fourth RF processors into baseband signals.

5. A method for receiving and processing signals at a base station in a mobile communication network, comprising:

(a) receiving signals through first and second polarized antennas respective having first and second branches and third and fourth branches formed in the same sector;

(b) time-delaying the signals received at the second branch of the first polarized antenna and the fourth branch of the second polarized antenna so as to distinguish offsets of the signals from offsets of signals received at the first and third branches;

(c) adding the signal received at the first branch and the signal received at the second branch and time-delayed into a first add signal, and adding the signal received at the third branch and the signal received at the fourth branch and time-delayed into a second add signal; and (d) separating an offset distinguishable signal from the first and second add signals.

6. The method of claim 5, wherein (c) further comprises respectively converting the first and second add signals into baseband signals.

7. The method of claim 5, wherein (a) further comprises converting the signals received at the first through fourth branches into IF signals, and (c) further comprises respectively converting the first and second add signals into baseband signals.

8. The method of claim 5, wherein (a) further comprises converting the signals received at the first through fourth branches into baseband signals.

9. A base station in a mobile communication network, comprising:

a polarized antenna having first and second branches;

a first delay element for time-delaying a signal received at the second branch of the polarized antenna so as to distinguish an offset of the signal from an offset of a signal received at the first branch;

a first adder for adding the signal received at the first branch and the signal received at the second branch and time-delayed by the first delay element;

a second adder for adding a first signal received at the antenna and a second signal received at the antenna and being time-delayed by a second delay element;

a modem processor for considering an offset distinguishable signal from the added signals as a different multipath signal, and separating the offset distinguishable signal from the added signals;

further comprising:

first and second RF (radio frequency) processors respectively connected to the first and second adders, for converting the respective signals from the first and second adders into IF (intermediate frequency) signals; and first and second IF processors respectively connected between the first and second RF processors and the modem processor.

* * * * *